United States Patent [19]

Rijswijck

[11] Patent Number: 4,865,864

[45] Date of Patent: Sep. 12, 1989

[54] AIR HEATED OVEN AND HEATING METHOD

[76] Inventor: Willem V. Rijswijck, 240 W. 800 North, Pleasant Grove, Utah 84062

[21] Appl. No.: 716,469

[22] Filed: Mar. 27, 1985

[51] Int. Cl.$^4$ .................. A23L 1/01; A47J 27/026
[52] U.S. Cl. .................... 426/520; 99/447; 219/400; 426/523
[58] Field of Search .................. 426/520, 523; 99/447, 99/421 R; 219/400

[56] References Cited

U.S. PATENT DOCUMENTS

| | | | |
|---|---|---|---|
| 3,770,408 | 11/1973 | McCully | 219/400 |
| 4,068,572 | 1/1978 | Vogt | 219/400 |
| 4,092,390 | 5/1978 | Mulvany, Jr. | 219/400 |
| 4,283,614 | 8/1981 | Tanaka et al. | 219/400 |
| 4,295,419 | 10/1981 | Langhammer | 99/447 |
| 4,369,760 | 1/1983 | Jorgensen et al. | 99/447 |
| 4,420,679 | 12/1983 | Howe | 219/400 |
| 4,491,065 | 1/1985 | Poulson | 99/447 |
| 4,503,760 | 3/1985 | Pryjutsch et al. | 99/447 |

*Primary Examiner*—George Yeung
*Attorney, Agent, or Firm*—George H. Mortimer

[57] ABSTRACT

An air oven having a heating space accessible through a hinged door provided with material holding means for holding, and optionally rotating, materials to be cooked solely by hot air supplied by electric heaters in a recirculating duct that removes air from the heating space at one end thereof, passes it over the heaters to heat it to high temperature suitable for rapid cooking of the materials to be cooked and introducing the hot air into the other end of the heating space to envelop with swirling action the materials to be cooked. The swirling motion is imparted to the air in the heating space by introducing it through a nozzle plate having nozzles directing the jets of air flowing through them at an angle in two planes at right angles to each other with respect to the axis of rotation of the material holding means. Preferably part of the air in the heating space is removed and exhausted to atmosphere through a filter to take out odors and particles before exhausting the air. The material holding means may take a number of forms, including a rod to serve as a spit for cooking meat roasts, whole chickens, and the like; a foraminous platform for supporting steaks, chops, baking potatoes, and the like; and one or two foraminous baskets for holding small pieces of materials to be cooked such as clams, shrimp, chicken parts, potato pieces to make French fries, and the like. Air cooled electric motors are provided to drive fans to cause air to flow as needed and to rotate selectively the material holding means. The interior walls of the heating space may be protected against deposit of grease thereon by a removable insert which, in effect, lines each interior wall with a metal sheet. The insert is readily cleaned by removing and immersing it in a cleaning bath. The entire operation of the oven is preferably automatically controlled by electronic control means.

6 Claims, 4 Drawing Sheets

AIR HEATED OVEN AND HEATING METHOD

INTRODUCTION

The present invention relates to air heated ovens and to a heating method. More particularly, it relates to (a) such ovens which comprise means to cause the air to swirl as it envelopes the material to be heated, and (b) to such a method in which the material to be heated is enveloped in swirling hot air. The material to be heated may be rotated in the swirling hot air to assure even heating of all parts of the material.

BACKGROUND OF THE INVENTION

Proposals to heat materials in ovens by heated air are known. For example, Langhammer U.S. Pat. No. 4,155,294 granted May 22, 1979, shows an air heated oven having a cylindrical space extending from the front of the oven rearwardly. Hot air is introduced into this cylindrical space somewhat tangentially near the bottom and withdrawn at the top for recirculation. The material to be heated is placed in a foraminous container within the cylindrical space and hot air is blown by a circulating fan past it from the tangential inlet below it to and out of the top outlet. The formaminous container is movable into and out of the cylindrical space by means of a handle. When the foraminous container is in place in the oven, the front opening into the cylindrical space in closed to prevent loss of hot air during operation. The material is stationary during heating by the circulating hot air and the air flows over it as an onflowing steam. Other ovens which use convection and/or microwave heat disclose air circulating means, e.g., Larson U.S. Pat. No. 4,332,992 granted June 1, 1982; Shin U.S. Pat. No. 4,369,347 granted Jan. 18, 1983; and Smith U.S. Pat. No. 4,409,453 granted Oct. 11, 1983, all disclose means for circulating air through the chamber where the materials to be heated by convection and/or microwaves are placed for heating.

SUMMARY OF THE INVENTION

The present invention provides an oven having a heating space into which materials are introduced to be heated solely by hot swirling air. Means may optionally be provided for rotating the materials to be heated during the heating operation. Preferably the heat source comprises electrical heating means over which the air to be introduced into the heating space in swirling manner is flowed. Also air circulating means is preferably provided to withdraw air from the heating space, to cause it to flow past the electrical heating means to reheat it and then to flow the reheated air back into the heating space in swirling manner. The heating of the material often releases moisture into the circulating air and, in order to prevent the humidity of the circulating air from becoming higher than desired, air removal means may be provided to remove part of the air from the heating space and exhaust it to atmosphere, preferably through a means to filter out odors and suspended particles before it is exhausted to atmosphere. The electrical heating means, air circulating means and air removal means are preferably automatically controlled.

BRIEF DESCRIPTION OF THE SEVERAL VIEWS OF THE DRAWING

The invention will be described in connection with the drawings in which.

DETAILED DESCRIPTION OF THE PREFERRED EMBODIMENT OF THE INVENTION

Figure 1:
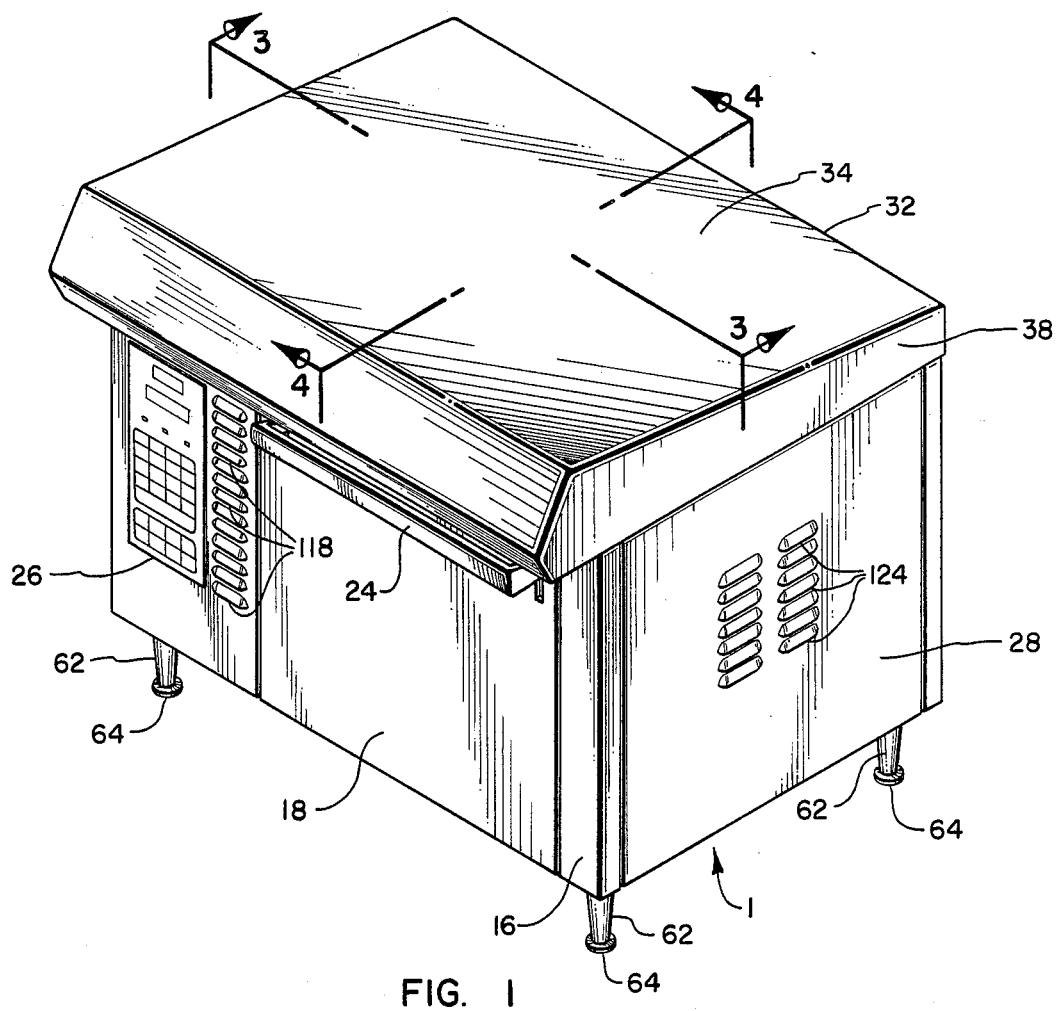
FIG. 1 is a perspective view of the top, front and right end of the oven.

The preferred embodiment of the invention comprises an oven having insulated bottom, top, back, front and end walls providing a heating space accessible through a hinged door in the front wall. Within the heating space are suitable material holding means for holding the material to be heated while it is being heated. The heating is accomplished by air which is heated, preferably by electrical heating units, and introduced in swirling manner into the heating space to envelop the materials to be heated. The material holding means may, for example, be a rod to serve as a spit, e.g, for a roast, a whole chicken and the like; a foraminous platform to support materials such as steaks, chops, baking potatoes and the like which rest thereon; a foraminous basket to hold small pieces of material such as clams, shrimp, chicken parts, potato pieces to make French fried potatoes, and the like. Preferably the rod when used as a spit and the basket are rotatable to assure even heating of the material they hold. Air withdrawal means is provided to withdraw air from the end of the heating space opposite from the end of air introduction. This withdrawn air is preferably circulated from the air outlet from the heating space, past the heating units to reheat it and then back through air swirling means into the heating space. Moisture is often released into the circulating air from the material being heated and, in order to prevent an undesired high humidity in the circulating air, air removal means are provided for removing part of the air from the heating space and discharging it to atmosphere, preferably through a filter to remove odors and any suspended particles before discharge. Cooling means may be provided to keep the electric motors cool that are provided to cause air to flow as described. The operation of the oven is preferably automated by electronic control means.

Referring now to the drawings, the oven is designated generally by reference number 1. It comprises external walls including a bottom wall 10, a back wall 12, a top wall 14, a front wall 16 and end walls 28 and 30. In the front wall 16 is a door 18 provided at the bottom with hinges (not shown) and at the top with one or more reciprocal latches 22 which are biased upwardly by a spring (not shown) and are moved down by a handle 24 having rearwardly projecting bars 25 pivotally connected at their inner ends to the lower ends of the latches and being pivoted at an intermediate point to the door so that movement of the handle up causes the latches to move down and permit the door to open. Also in the front wall 16 is a control panel 26 having a plurality of control buttons for operating the oven by means described hereinafter. Above the top wall 14 is a lid 32 having a top wall 34, a back wall 36, end walls 38 and 40 and a front wall 42. It also comprises interior walls forming the heating space including a top wall 44, a bottom wall 46 and a back wall 48, e.g., including a vertical portion and two sloping portions connecting the vertical portion to the top and bottom walls. The walls 44, 46 and 48 may, if desired, be integral.

Spaced inwardly from end walls 28 and 30 are insulated walls 50 and 54 in contact with and joined to walls 10, 12, 14 and 16 beyond the door opening in 16. Inwardly spaced from wall 50 is wall 52 which forms one end wall of the heating space. At the other end of the heating space is another end wall 56, preferably only peripheral flanges that leave a large central opening.

Figure 4:
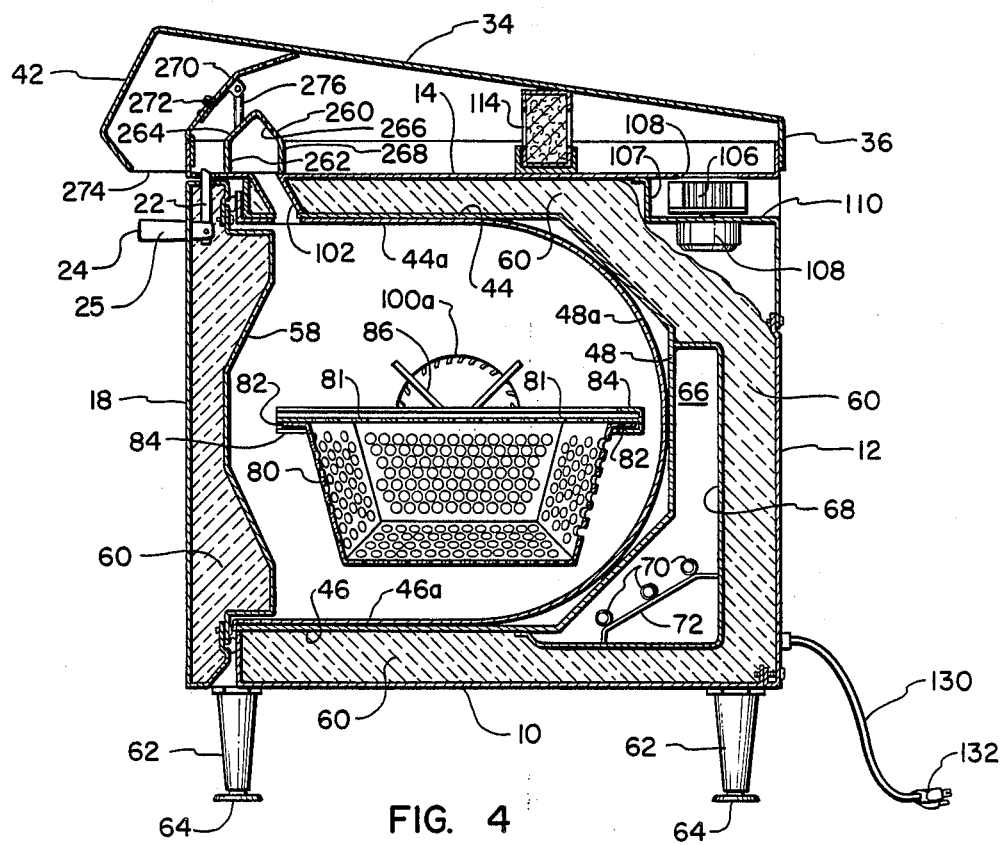
FIG. 4 is a vertical transverse sectional view through the oven on the line 4—4 of FIG. 1.
Figure 5:
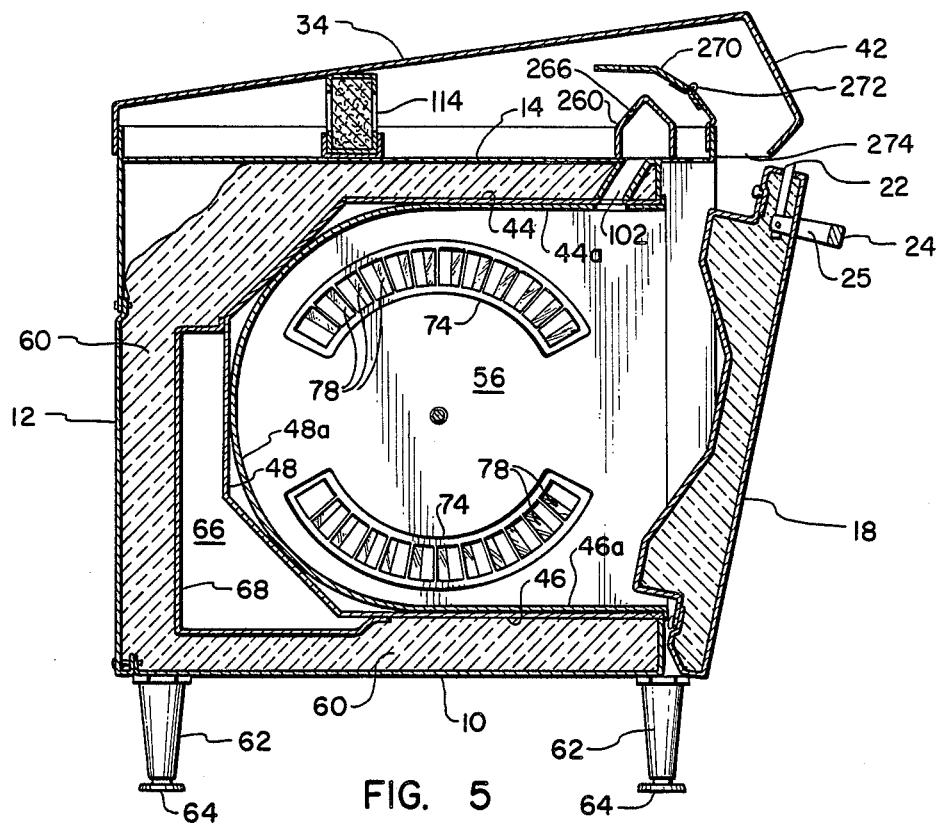
FIG. 5 is vertical transverse sectional view through the oven looking at the right end wall.

The door 18 is illustrated as having an inner wall 58 that is concavely shaped to give the heating space a somewhat cylindrical contour in cross section, as seen in FIGS. 4 and 5. All double wall sections are filled with insulating material 60 of any desired type to provide insulation for the oven and other parts referred to hereinafter.

Any oven produces vapors from the materials being cooked which condense on the interior walls, necessitating periodic cleaning of these walls. In order to minimize the deposit of the vaporized material on the inner walls 44, 46, 48, 52 and 56, a readily removable insert is preferably provided which comprises a top wall 44a, a bottom wall 46a, a back wall 48a which comprises a top wall 44a, a bottom wall 46a, a back wall 48a which preferably is semicylindrical in shape, a left end wall 52a having an air outlet opening 100a, and right end wall 56a having an air inlet opening 74a. The vapors which form when the material is cooked are substantially all deposited on the inner surface of the insert which can readily be cleaned when it is removed from the oven, e.g, by immersing it in cleaning fluid.

Secured to the corners of the bottom wall 12 are legs 62 having vertical adjusting bolts 64 to provide for stable support for the oven on a floor or like supporting surface that may not be a true plane.

A duct 66 is provided which in part is located behind the wall 48, as seen in FIG. 4 and 5. In this duct 66 are located a plurality, e.g., three (3) electrical heating units 70 supported on a rack 72. These units are connected to a source of electrical power, as described hereinafter, to supply heat for the air that is introduced into the heating space of the oven. The heated air is introduced into the heating space through air inlet openings 74 in wall 56 and 74a in the right wall 56a of the insert. Connected to outside wall 56 is a nozzle plate 76 having nozzles 78 arranged on an arc concentric with the semicylindrical wall 48a of the oven insert, as seen in FIG. 5. The nozzles may be formed by radial baffles spanning an arcuate opening in plate 76. These baffles are curved in cross section like turbine blades and an inward component of the jet streams can be obtained by sloping the walls between the baffles or blades inwardly from outside to inside. The air passage through each nozzle is thus at an angle with respect to the axis of the wall 48a in two planes at right angles to each other so that air jetting therefrom is directed inwardly toward the center of the heating space and outwardly with respect to said axis to create the swirling action of the hot air introduced into the heating space. In other words, the air is given a circular or spriral or helical motion on passing through the nozzles or spaces between the vanes that creates the swirling action within the heating space. This spiral or helical motion greatly prolongs the time of contact of any portion of the air stream with the material to be heated, enabling it to give up much more of its heat content to the material being heated than occurs when the air flows essentially longitudinally through the heating space. In other words, it causes the heating space to be completely filled with swirling air and thus bring a maximum amount of heated air into contact with the material to be heated.

The material to be heated, if in small pieces as mentioned above, is preferably placed in a foraminous basket 80 which is thus used in connection with the oven but need not be a part of the combination constituting the oven. It comprises bottom, side and end walls, the latter being preferably turned out to form a flange 82 at each end, although any way of forming such a flange is satisfactory. These flanges 82 are adapted to be received within a groove provided at each end of the basket, as described more fully hereinafter. Preferably two such baskets 80 are used, one on each side of a foraminous platform 81 which has a channel-shaped support 84 at each end. Each channel-shaped support 84 has an inwardly opening groove at each side of the platform 81 into which the flanges 82 at each end of each basket is slidable. To connect the baskets to the platform, it is moved to horizontal position, the end flanges 82 of one basket are then inserted into the grooves on the lower side of the platform, the platform is rotated 180 degrees to bring the surface that was on top to the bottom and the flanges of the second basket are then inserted into the grooves now on the lower side of the platform. This method of attaching one or two baskets to the platform permits the small pieces of material therein to rest on the bottom of the basket until it is in position on the under side of the platform which then becomes a lid for the basket permitting it to be rotated without spilling any small pieces from it.

The foraminous platform 81 may be used in horizontal position without a basket to support materials such as steaks, chops, baking potatoes, and the like in stationary position during heating with the swirling air making contact with such materials by flowing through holes in the platform from below and by swirling around the exposed surfaces above the platform. When so used, the platform is held in the horizontal position throughout the heating opoeration.

The means for holding material to be heated may also be a simnple rod that, in side view, looks like the platform 81 in FIG. 5 but without the basket 80.

Figure 3:
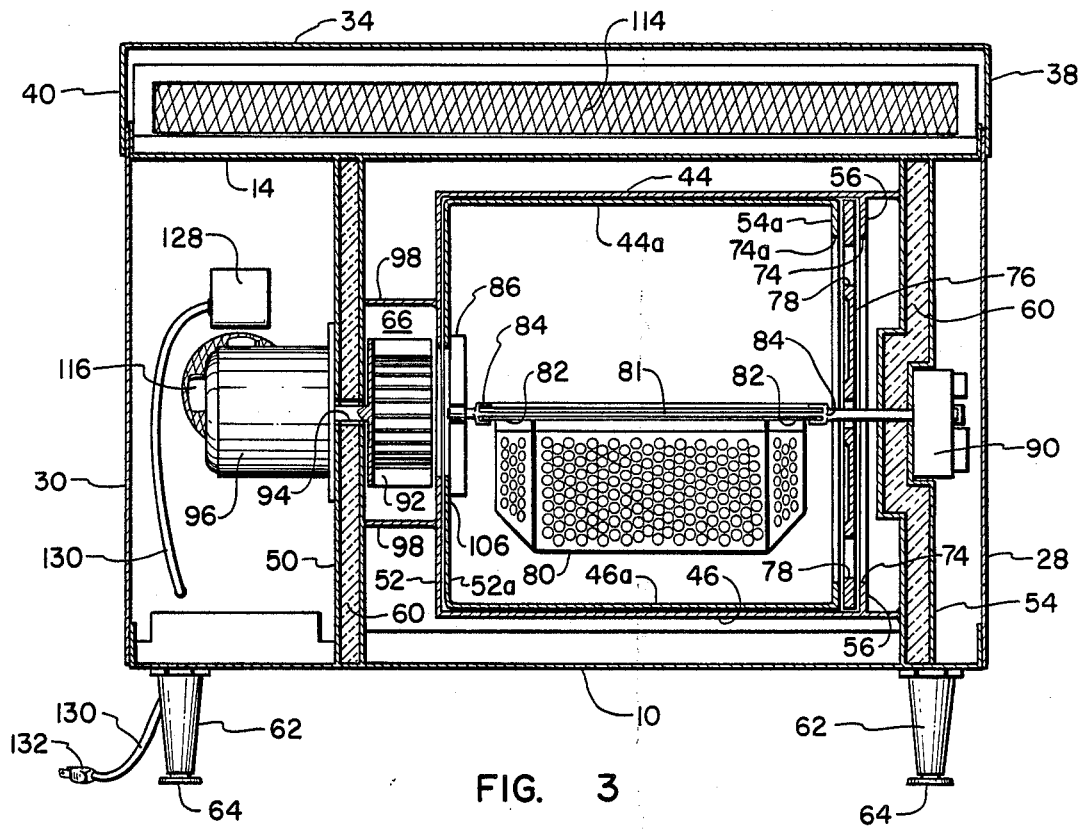
FIG. 3 is a vertical longitudinal sectional view of the oven on the line 3—3 of FIG. 1.

Means are provided to mount the platform or rod in the heating space of the oven. For example, the supports 84 at the left and right ends, respectively, of the platform 81 are removably connected to shafts having bearings in which the shafts are rotatable. At the right end, as seen in FIG. 3, the shaft 86 has a bearing surface in wall 86 which is connected to the wall 52a of the insert spanning opening 100a. A rotisserie motor 90 is provided to rotate shaft 88 and any material holding means removably conneced thereto. The rotisserie motor has a built in gear drive, as those skilled in the art know, to rotate the shaft 88 and associated parts at a relatively low RPM, when such rotation is desired.

In the space between walls 50 and 52 is a centrifugal blower 92 connected by shaft 94 through wall 54 to the motor 96, constituting an air circulating fan for the oven. Blower 92 is in a snail housing comprising a wall 98 which makes air-tight contact with portions of the walls 50 and 52. This snail housing communicates with the heating space through openings 100 in wall 52 and 100a in insert wall 52a which form the inlet opening into the snail housing. The outlet of the snail housing is into the left end of duct 66. The other end of duct 66 communicates by means of the space between walls 56 and 60 and through opening 74, nozzle 78 and opening 74a to introduce the circulating air into the heating space 5 with swirling motion, as previously described. The motor driven blower 92 in the snail housing, the duct 66, the opening 74, the nozzles 78 and opening 74a therefore constitute a recirculating system for air which enters the heating space with swirling motion through nozzles 78 and leaves through openings 100 and 100a.

In the top wall 14 of the heating space is an exhaust air outlet comprising a plurality of passageways 102 which communicate with the heating space and the space between wall 14 and the lid 32 near the front of the oven. Toward the back of the oven is an exhaust opening 104 below which is a centrifugal blower 106 in a duct 107. The blower 106 is driven by an electric motor 108 just below the bottom wall of duct 107. Air entering the duct 107 through opening 104 exhausts to the atmosphere through opening 110 in the back wall 12 of the oven. The back wall is provided with slots 112 adjacent to motor 108 to permit air to flow into the space surrounding motor 108 to cool it. Between passageways 102 and opening 104 is an air filter 114 running the length and height of the space between wall 14 and the lid 32 so that all air flowing out of the heating space through passageways 102 has to pass through the filter before exhausting to the atmosphere. This filters out odors and particles that are formed in the heating chamber and prevents them from leaving the oven.

Figure 2:
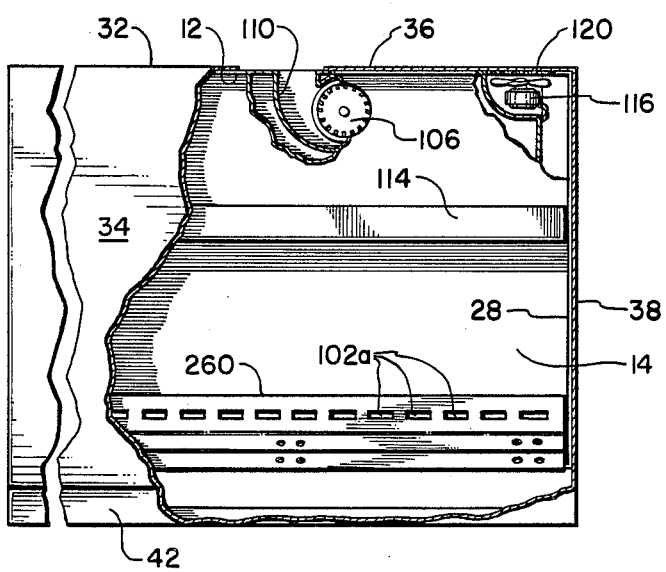
FIG. 2 is a top plan view with parts broken away to reveal internal structure.
Figure 6:
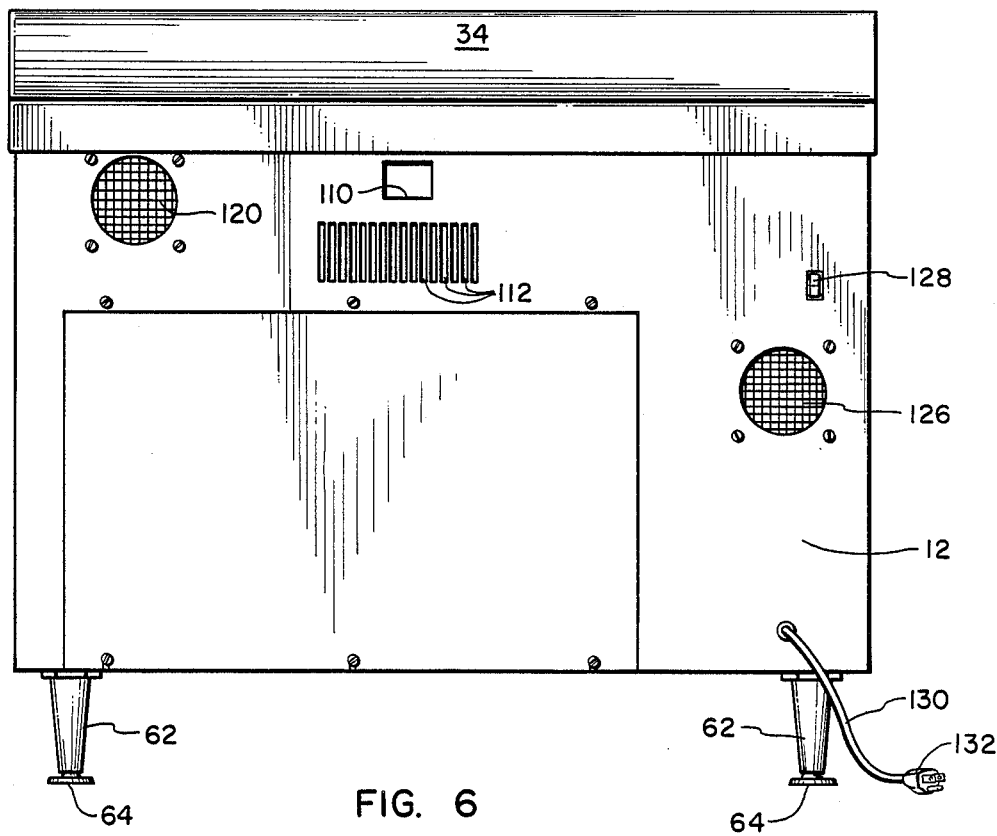
FIG. 6 is a back view of the oven.

Mounted on the back wall of the compartment between external end wall 30 and wall 52 in which motor 92 and the control board 24 are located is a first cooling fan 116. Cooling air enters this comnpartment through openings 118 in the front wall 16 adjacent to control board 24 and exits through opening 120 in the back wall 12, as seen in FIGS. 2, 3 and 6.

A second cooling fan 122 (FIG. 7) is provided for cooling the electric motor for the rotissirie 90. Cooling air is supplied through openings 124 in end wall 28 and exhausts to atmosphere through opening 126 in back wall 12.

As a safety precaution, openings 120 and 126 may be covered with a screen through which the air can flow without substantial resistance but which can effectively prevent accidental contact of a hand with the blowers of the cooling fans.

Electricity is supplied to the oven through an electric supply cord 130 which may be connected to a convenience outlet in the electric system of the building where the oven is used by means of a plug 132. It preferably supplies single phase current at a commercial frequency (in U.S.A. usually 60 Hz. and abroad usually 50 Hz) to the oven through a switch 128 which may be located in any convenient location, e.g., on the back wall 14 as shown in FIGS. 3 and 6. Preferably the electric supply cord 130 is a four wire cord comprising a black wire 150, a red wire 152, a neutral white wire 154 and a ground wire 156. Across the red and black wires is a potential of 220 to 240 volts and from red to white and black to white is a potential of half of that voltage, viz., 110 to 120 volts. The neutral white wire 154 and the ground wire 156 are at the same potential.

Figure 7:
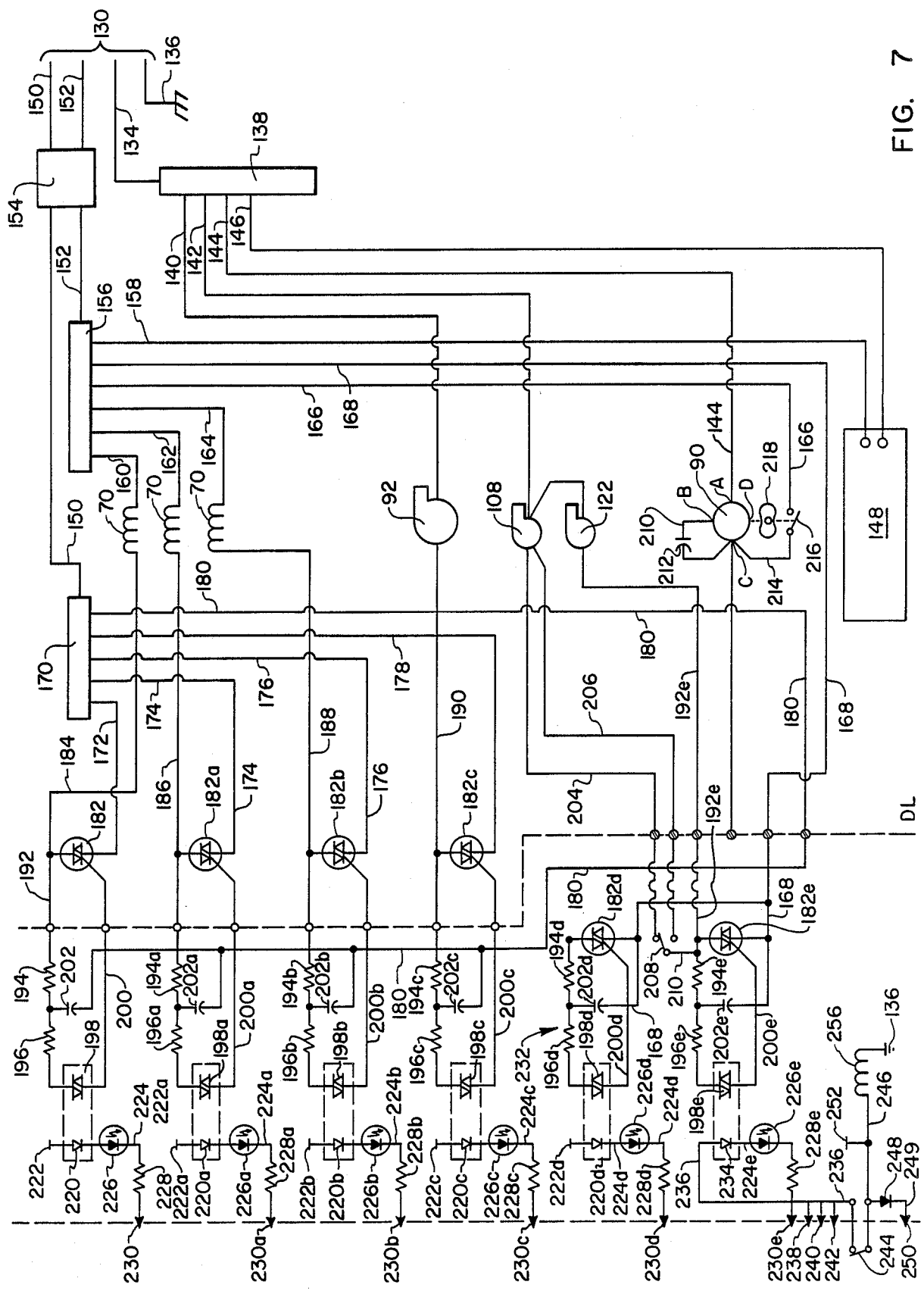
FIG. 7 is a schemtic wiring diagram.

Referring now to FIG. 7, which a schematic wiring diagram, the motor supply system, which is preferably alternating current at a voltage of about 110 to 120 volts, comprises a neutral bus 138 connected to white wire 134 to which lines 140, 142, 144 and 146 are connected at one end. Line 140 is connected at the other end to oven fan motor 92, line 142 to cooling fan motors 108 and 122, line 144 to rotisserie motor 90 and line 146 to a logic board/148 of control 26.

The system for supplying elecric heaters 70 with current at a voltage of 220 to 240 volts comprises a red bus 156 connected to red line 152 and a black bus/170 connected to black line 150. Lines 150 and 152 include a circuit breaker 154.

Red bus 156 is connected to said logic board 148 by line 158, by lines 160, 162 and 164, respectively, to one terminal of the three heaters 70, by line 166 to the rotissirie motor 90, as further described hereafter, and by line 168 through controls to be described hereinafter to the other side of motors 90, 108 and 122, putting about 110 volts across these motors from red to white lines.

Black bus 170 is connected by line 172 through a triac 182 and line 184 to the other terminal of one of the heaters 70, by line 174 through a triac 182a and line 186 to the other terminal of a second heater 70, by line 176 through triac 182b and line 188 to the other terminal of the third heater 70, and by line 178 through triac 182c and line 190 through motor 92 and line 140 to bus 138, thus putting about 220 volts in parallel across the heaters 70 and about 110 volts across the motor 92. Line 180 connects the black bus 170 through circuits to heaters 70 and motor 92 now to be described.

Each of these triacs is in a like circuit of which only the first is described, reference characters for the others bearing suffixes "a ". "b" and "c" but otherwise being the same. It comprises a first resistor 194, a second resistor 196 and a second triac 198, with a return line 200 connecting the two triacs 182 and 198. Line 168 is similarly connected to the circuits for motors 108 and 122. Motor 108 has two separate windings, one for slow speed and one for high speed. The high speed winding is connected by line 204 to one terminal of a speed selector switch and the low speed winding is connected by line 206 to the other terminal of switch 208. The selector arm of switch 208 is connected by line 210 to line 192e adjacent to a terminal of triac 182e. Line 192e is connected (1) to bus 138 through motor 122 and line 142, (2) to triac 182e and (3) to resistor 194e. When the selector arm is connected to line 204 the motor operates at the higher speed and when connected to line 206 it operates at slower speed.

Rotisserie motor 90 has four terminalls A, B, C and D. Line 144 from white bus 138 is connected to terminal A. Terminal B is connected by line 210 having a condenser 212 in series in it to terminal C which is connected also (1) to terminal D by line 214 through switch 216 and detent 218 and (2) to red bus 156 by line 166.

Reference number 220 represents a diode which, in practice, is built into a unit with triac 198 with its anode connected to a source 222 of positive voltage, e.g., about 5 volts, and its cathode conncted in series with a light emitting diode 226 in line 224 in series with a resistor 228 connected to a terminal 230 leading to a switch (not shown) for turning the power to heating coil 70 on and off. The energizing of diode 220 at low voltage activates triac 198e to send a small current to triac 182 which closes the high voltage (e.g., 220 volts) circuit througha heating coil 70.

The same type of circuit is provided for energizing the second and third heating coils 70 and each bears the same reference characters as the circuit just described but with each character having a distinguishing suffix "a" or "b" added.

A similar circuit is also provided for energizing motor 92, each part bearing the same reference number with the added suffix "c". The voltage to the motor, however, is preferably 110-120 volts, as described above.

A further similar circuit 232 is provided for cooling motor 108 and for cooling motor 122 in parallel, each part having the same referencenumber with a suffix d.

The control circuit 232 for motors 108 and 122 includes a diode 234 having its cathode connected by line 224e through light emitting diode 226e and resistor 228e to terminal 230e. Its anode is connected by line 236 to terminals 238, 240 and 242, to door interlock switch 244 and line 246. Line 246 is connected by line 249 through diode 248 to terminal 250, source 252 of low voltage (e.g., about 5 volts), inductor 256 and ground 136. Door interlock switch 244 is opened when the door is closed, permitting a spring (not shown) to raise rod 276 and close flap 270. When the oven door is opened it closes the microswitch which has two effects, (1) to activate the solenoid and open flap 270 and (2) to move s; witch 208 to ooperate motor 108 at high speed.

The dashed line DL represents an interface between the high voltage power winding and the low voltage control winding. The small circles in line DL represent connecting terminals.

Opening door 18 closes a microswitch (not shown) which energizes a solenoid (not shown) to pull rods 276 down and open flap 270 to permit air entering opening 274 to flow out of the oven through 110 as described.

The exhaust of high hummidity air through outlet passageways 102 is insufficient during times when door 18 is opened slightly. At this time the hot, humid air flows partly through openings 102 and largely through 274. It is advantageous at these times to ventilate the space between the top wall 14 and the lid 32. Means for accomplishing this operation comprise a plenum hood 260 comprising an upright wall 262 running along the outside of the openings 102 for the full length of the oven, an upwardly sloping wall 264 connected thereto, a downwardly sloping wall 266 and a vertical wall 268 engaging top wall 14. Wall 266 has openings 102a therein, as seen in FIG. 2, which permit air flowing into the hood from the oven to vent into the plenum under cover 34 and from there to atmosphere through 110. A damper 270 hinged at 272 at each end runs the length of the hood 260 and closes the passageway from opening 274 into the plenum under 34 when the door 18 is closed. When door 18 is opened, a solenoid (not shown> pulls connecting rod downwardly to open the passageway from inlet opening 274 to outlet opening 110. If desired, the damper may also close openings 102a and thus limit flow of the hot, humid air from the oven to the outside route into opening 274. At the same time this air flow is taking place, air from the atmosphere mixes with it which sweeps out humid air containing odors and any particlesentrained therewith may be removed by fillter 114.

Althouogh the invention has been described in connection with the presently best known embodiment thereof, it will be understood that modifications and variations may be made without departing from the principles of the invention set forth above.

Having thus described and illustrated the invention, what is claimed is:

1. A method of heating which comprises holding material to be heated in a heating space having an air inlet at one end and an air outlet at the other end and enveloping said material in a stream of hot spirally moving air introduced at one end into the heating space through the air inlet and withdrawn from the other end thereof through the air outlet.

2. A method of heating as set forth in claim 1 in which the material is rotated on an axis concentric with the hot sprially moving air.

3. A method of heating as set forth in claim 1 hot spirally moving air is introduced at a first end of said heating space as an annular rotating stream which spirals through said heating space and exhausts at the other end of said heating space.

4. A method of heating as set forth in claim 3 in which the air exhausted from the heating space is heated and reintroduced at said first end.

5. A method of heating as set forth in claim 1 in which the material heated is food.

6. An oven comprising means forming a heating space having a hot air inlet at one end and an air outlet at the other end, means for holding material to be heated in said heating space, and means for enveloping such material to be heated in a stream of hot spirally moving air introduced through the air inlet into the heating space and withdrawn therefrom through the said outlet.

* * * * *